United States Patent [19]

Roach et al.

[11] 4,236,823
[45] Dec. 2, 1980

[54] DIFFRACTOMETER FOR MEASURING SIGNAL DEPTH AND WIDTH

[75] Inventors: William R. Roach, Rocky Hill; Ping Sheng, Princeton, both of N.J.

[73] Assignee: RCA Corporation, New York, N.Y.

[21] Appl. No.: 16,110

[22] Filed: Feb. 28, 1979

[30] Foreign Application Priority Data

Sep. 18, 1978 [GB] United Kingdom ............... 37195/78

[51] Int. Cl.³ .................. G01B 9/02; G01B 11/22
[52] U.S. Cl. .................................. 356/351; 356/355; 356/378
[58] Field of Search ............... 356/351, 354, 369, 376, 356/378, 355, 356; 250/562, 572; 179/100.3 E, 100.3 G, 100.3 V, 100.41 R, 100.41 C, 100.41 L; 365/124; 358/127

[56] References Cited

U.S. PATENT DOCUMENTS

| | | | |
|---|---|---|---|
| 2,315,282 | 3/1943 | Snow | 356/446 |
| 2,604,809 | 7/1952 | Mitchell | 356/446 |
| 3,176,306 | 3/1965 | Burns | 346/33 F |
| 4,030,835 | 6/1977 | Firester et al. | 356/111 |
| 4,069,484 | 1/1978 | Firester et al. | 346/33 F |
| 4,180,830 | 12/1979 | Roach | 250/562 X |

OTHER PUBLICATIONS

Bonin, "Multiple Imaging Using Various Types of Simple Phase Gratings," Applied Optics, vol. 11. No. 8 (Aug. 1972) pp. 1782-1792.

Primary Examiner—Vincent P. McGraw
Assistant Examiner—Rodney B. Bovernick
Attorney, Agent, or Firm—E. M. Whitacre; J. S. Tripoli; J. E. Roehling

[57] ABSTRACT

An incident light beam illuminates the surface of a disc, having signal elements recorded therein in the form of a succession of spaced apart depressions, with a light spot that spans a plurality of depressions. The structure of the depressions serves as a diffraction grating which reflects the incident light beam into a plurality of substantially coplanar diverging fans of light. Polarizers are interposed between the light beam source and the surface to polarize the light beam in orthogonal directions. Photodetectors, positioned to intercept the reflected fans, provide outputs corresponding to the light power in the reflected fans. The photodetectors provide a first output of the reflected light power of the light beam polarized in a first direction and a second output of the light power of the reflected light beam polarized in a direction orthogonal to the first direction. The ratio of the first output to the second output is indicative of the depression depth.

10 Claims, 8 Drawing Figures

DIFFRACTOMETER FOR MEASURING SIGNAL DEPTH AND WIDTH

The present invention relates generally to optical diffraction systems, and particularly to optical diffraction systems which may be employed with a surface having a regular pattern of depressions formed therein, such as a video disc of the type described in U.S. Pat. No. 3,842,194 issued to Jon K. Clemens, to provide estimations of depression depth and width.

The depth and width estimation principles of the present invention are illustratively applicable and will be described with reference to optical inspection of a spiral information track comprising signal elements in the form of spaced apart depressions in video disc records at various manufacturing stages throughout the record mastering and replicating processes.

In one illustrative process of producing a video disc record having spiral grooves, a disc master (to be used for recording) is formed by (1) mechanically cutting a spiral groove of a trapezoidal cross-section in a copper-coated aluminum disc and (2) coating the grooved surface with electron beam sensitive material. The coated disc is mounted on a turntable of an electron beam disc recorder in the path of a finely focused beam of electrons. The beam is turned on and off in response to a recording signal, to expose various portions of the groove bottom as the disc is rotated and translated with respect to the impinging beam to form signal elements. Those portions of the groove bottom struck by the electron beam are subsequently removed by development of the sensitive material. After exposure and development, the master disc has a relief pattern representative of the signals recorded in the groove. Molds for making stampers for producing production line records are made from these masters. In the final stages of manufacturing a video disc, a vinyl substrate is formed with the desired relief pattern using a stamper made from a mold.

In the processes for manufacturing a video disc record, such as the type supra, formation of uniform spiral grooves and signal elements free of significant variations in their respective depth is an important factor for obtaining high quality video signal recordings. Each stage of record manufacture can be a critical stage wherein undesirable variations in groove and/or signal element depth, which affect the production of quality video records, must be minimized.

Pursuant to an approach described in U.S. Patent Application Ser. No. 810,735 now U.S. Pat. No. 4,180,830 of W. R. Roach, et al., filed on June 28, 1977, an optical signal depth estimation system is provided for directing a beam of light at a disc having a grooved surface. The incident beam illuminates a portion of the surface, and the groove and signal element structure in the illuminated region effectively form crossed diffraction gratings. The interaction of the light with the gratings generates (a) a beam undeflected by either grooves or signal elements and having power $I_{0,0}$; (b) diffraction orders that are diffracted by the grooves but not by the signal elements each having power $I_{n,0}$; and (c) diffraction orders that are diffracted by both the signal elements and the grooves each having power $I_{n,s}$. Here n is an integer that can take on any value between $-m$ and $+m$ where m is the maximum integer value for which the equation $$n\lambda_p = G \sin \theta_n \quad (1)$$

has a real solution for $\theta_n$ where $\lambda_p$ is the probe laser wavelength, G is the grating spacing, and $\theta_n$ is the diffraction angle. The set of beams n, 0, containing power $I_{n,0}$, $(n = -m, \ldots 0, \ldots m)$ diverges in a fan pattern from the point of incidence on the disc surface. Similar fans of light are deployed at an angle $\pm \theta_s$ on either side of this zero groove order fan and contain power $I_{n,s}$ $(n = -m, \ldots, 0, \ldots, m; s = \pm 1, \pm 2, \ldots, \pm t)$ where t is the maximum value for which the signal diffraction equation $$s\lambda_p = \Lambda_m \sin \theta_s \quad (2)$$

has a real solution for $\theta_s$ where $\Lambda_m$ is the signal element spacing. In general, s is equal to $\pm 1$ or at most $\pm 2$. A set of photo detectors is positioned so that the photosensitive surfaces are arranged to intercept substantially all of the light contained in the zero signal order groove diffraction fan. The total light flux collected by this array is $\pm IO$ where:

$$IO = \sum_{n=-m}^{m} I_{n,0} \quad (3)$$

Another photodetector, having a large photosensitive surface, is positioned in a plane which is angularly disposed with respect to the grooved disc surface and which laterally intersects the groove convolutions. This photodetector intercepts substantially all of the light diffracted by the signal elements from the illuminated region on one side of a radial plane which contains the illuminated spot and the disc center. The total light flux collected by this detector is IS where:

$$IS = \sum_{s=+1}^{+t} \sum_{n=-m}^{m} I_{n,s} \quad (4)$$

The intercepted light substantially corresponds to the first order signal diffracted light. Pursuant to this approach the signal element depth which is related to the ratio of IS to IO is then determined.

The Roach method, as described above, is not as accurate as one might desire when the signal elements do not extend across the full width of the groove or when the signal width is less than the center to center track spacing, as described in the Clemens patent, and when the signal element spacing is substantially equal to the probe wavelength. When the signal elements do not fully extend across the track, the power IO in the undeviated zero signal diffraction order beams of light includes a contribution from the "flat" area between the signal elements (i.e., the area between the groove edge and the signal edge). Since these non-depressed areas do not contribute to the signal diffracted light the signal depth is not easily determined from the ratio of IS to IO.

When the signal elements on a video disc have a nominal spacing, $\Lambda_m$, that is comparable to the wavelength of the light being used as the probe, $\lambda_p$, the scalar diffraction theory, which predicts that diffraction intensities are independent of polarization, breaks down. The results of a detailed calculation of the diffraction of a polarized plane wave by a square wave relief pattern covered with a surface of infinite conductivity indicate that when the signal elements become short in wavelength there should be a strong polarization dependence. Such a polarization dependence has been observed experimentally for measurements of signal depth made on metal coated video discs of the Clemens type. It was found that the polarization effects are strongest with the higher conductivity materials (e.g., gold and silver) and weaker for lower conductivity materials (e.g., bismuth).

In accordance with the principles of the present invention, an optical depression depth estimation system is provided. This system includes means for illuminating a structure, having successively spaced-apart depressions of a given cross-sectional shape, with a coherent beam of light. The structure of the depressions in the region illuminated by the light beam serves as a diffraction grating for diffracting light from the illuminated region in a diffraction pattern having a zero order and higher orders. The system further includes means for detecting the light power diffracted from the illuminated region in the higher diffraction orders and means, interposed between the illuminating means and the detecting means, for polarizing the light detected in a first direction and in a second direction orthogonal to the first direction. The detecting means provides a first output of the light power for the first polarization and a second output of the light power for the second polarization. The ratio of the light power outputs being indicative of the depression depth.

Figure 4A:
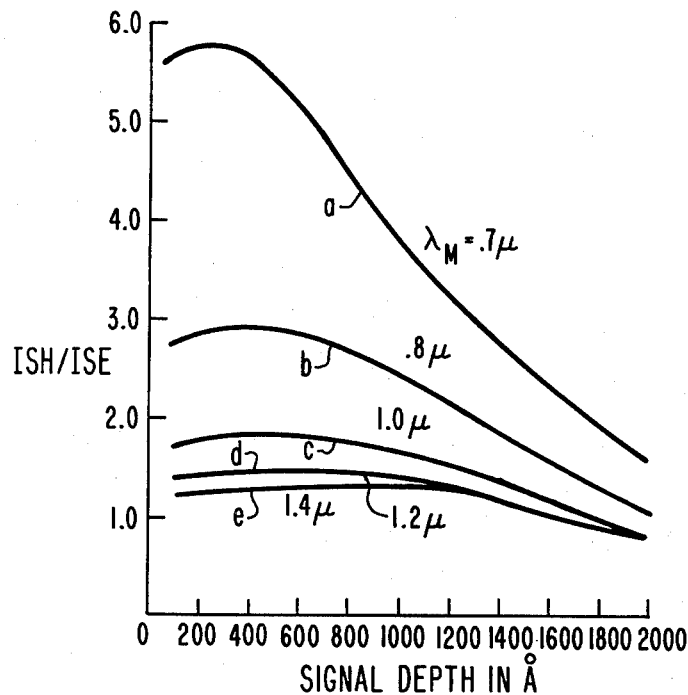
Figure 4B:
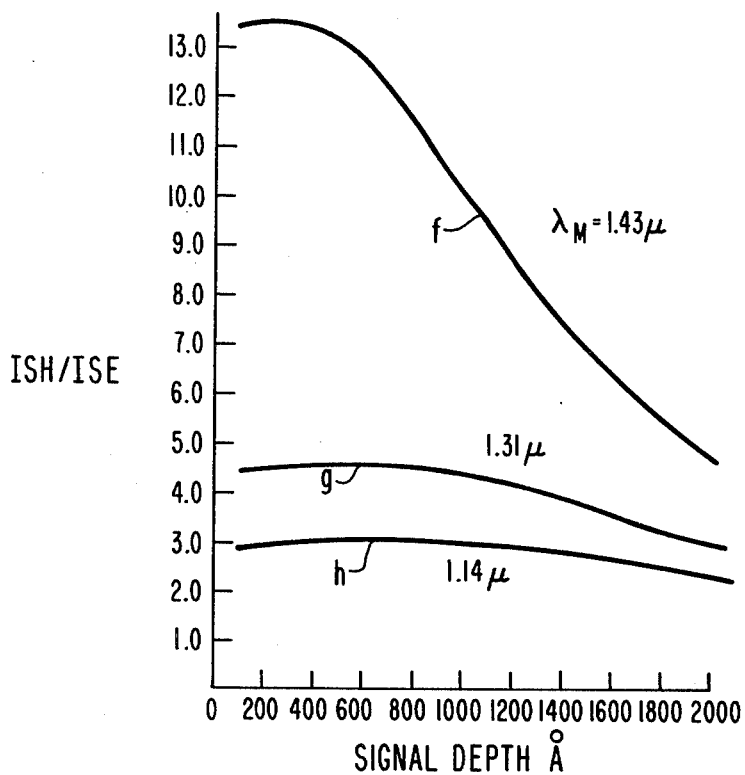
Figure 4C:
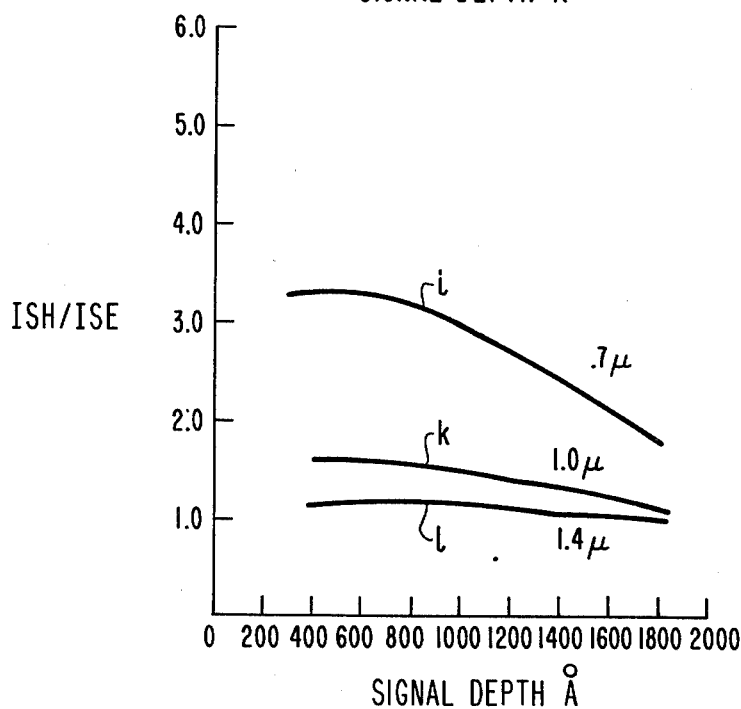
Figure 6:
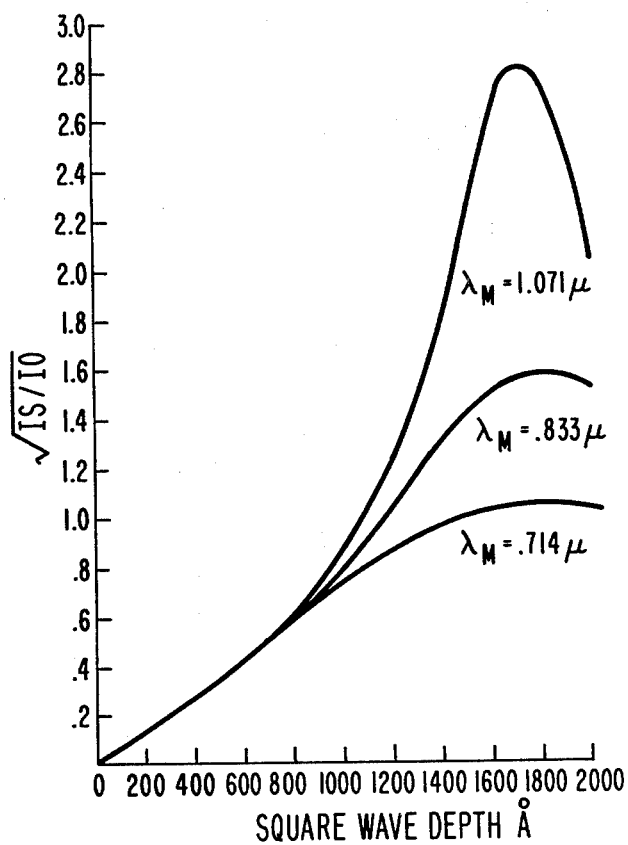
Figure 5:
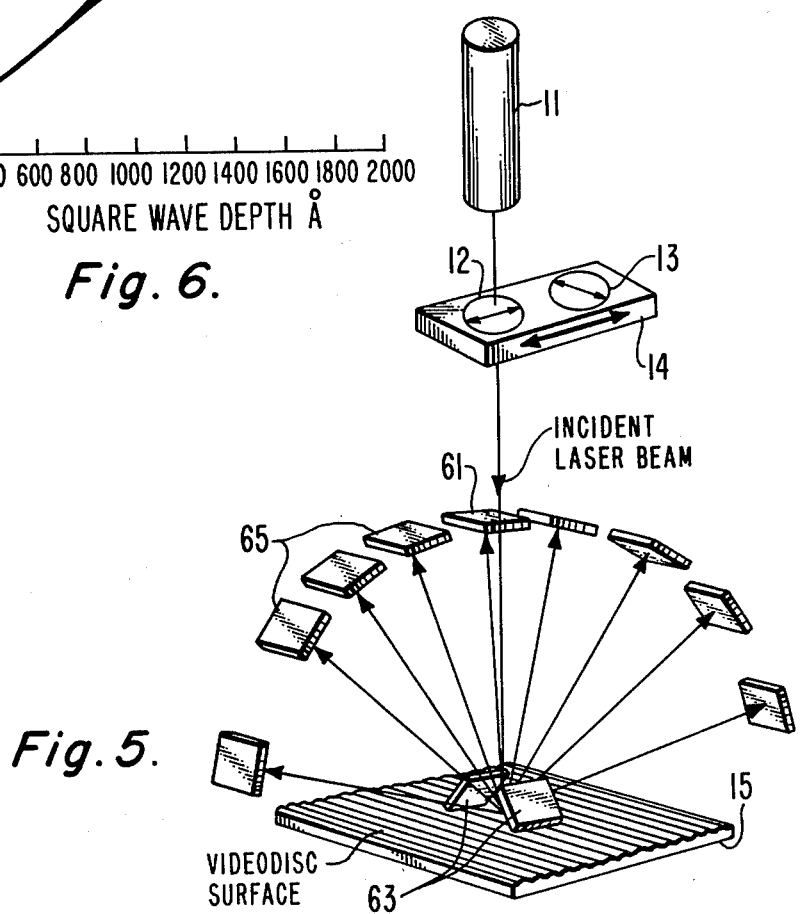

FIGS. 4a, 4b, and 4c show graphs of the ratios of light powers versus signal depth;

FIG. 5 illustrates a system for measuring depression depth of signal elements on a video disc surface embodying the principles of the present invention; and FIG. 6 shows graphs of the square root of the ratios of light powers versus signal depth.

Figure 1:
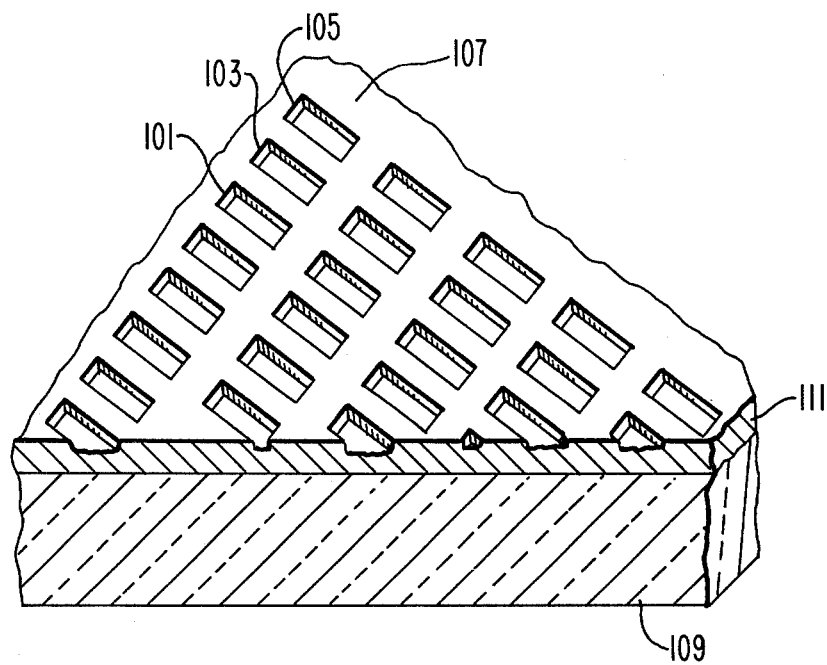
FIG. 1 illustrates, in isometric form, a portion of a flat surface structure having successively spaced-apart depressions therein.
Figure 2:
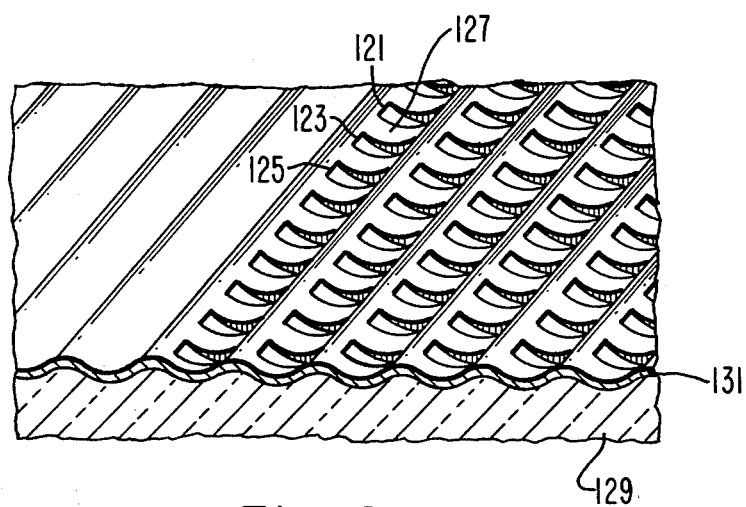
FIG. 2 illustrates, in isometric form, a portion of a grooved surface structure having successively spaced-apart depressions therein.

In the isometric illustrations of FIGS. 1 and 2, a portion of a flat surfaced and a grooved surfaced structure having signal depressions recorded thereon are respectively shown. The isometric view of FIG. 1 illustrates a flat surfaced structure having a regular pattern of elevations and depressions. Pits 101, 103 and 105 represent signal elements recorded along an information track 107 on a structure 109 which has a flat conductive surface 111. A cross-section of the information track (formed by a plane cutting along the track elongation, through the center of the track and perpendicular to the surface) would illustrate a square wave shape of the signal elements (pits). In other embodiments, the cross-section (through the center of the track) could have other shapes, for example, sinusoidal or triangular (not shown in FIGS. 1 and 2).

The isometric view of FIG. 2 illustrates a grooved structure which also may be used in accordance with the present invention. The cross-section taken in the plane perpendicular to the groove elongation shows a sinusoidally varying structure having a regular pattern of elevations and depressions. Pits 121, 123 and 125 represent signal elements recorded along a groove 127 on a structure 129 which has a conductive surface 131. A cross-section of the groove bottom (formed by a plane cutting along the groove elongation, through the center of the groove and perpendicular to the surface) would illustrate a square wave shape of the signal elements. In other embodiments, the cross-section of the groove bottom (taken along the groove centerline) could have other shapes, for example, sinusoidal or triangular (not shown in FIG. 2).

Figure 3:
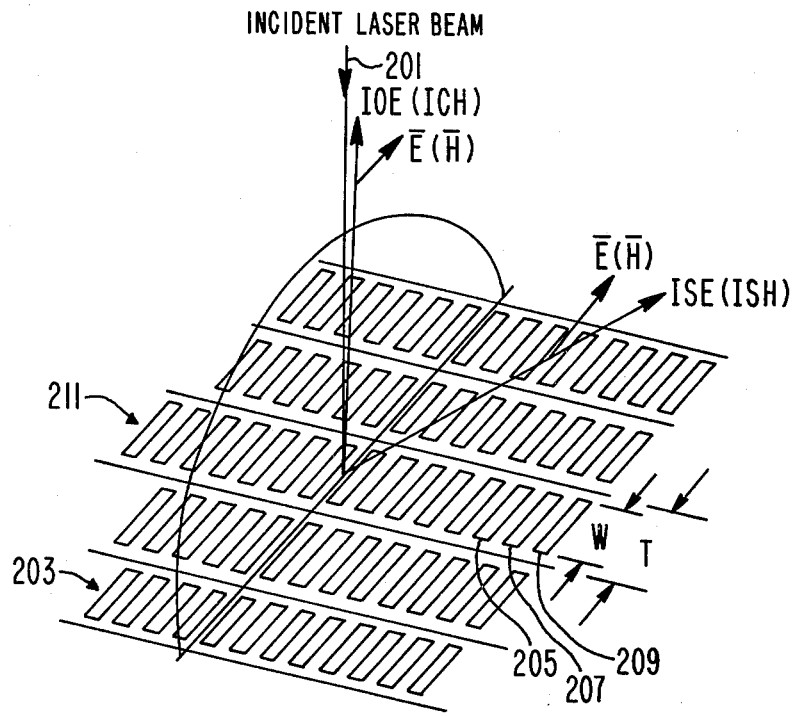
FIG. 3 illustrates the orientation of the orthogonal polarizations of an incident laser beam diffracted from a flat surfaced structure having successively spaced-apart depressions therein.

Referring to FIG. 3, a coherent light beam 201 from a light source not shown in the FIGURE (illustratively, in the form of a laser) is incident on the surface of a disc 203. In the illuminated area of the disc signal elements 205, 207 and 209 have a width W, a substantially constant depth and a substantially constant repetition rate along an information track 211. The spacing between elements may in fact vary to form in effect a frequency modulated signal, but, the spacing does not vary greatly from a nominal value. The nominal value is comparable to the wavelength of the light from the laser light source. The information track has a width T. The light beam 201 illuminates the surface of the disc with a light spot having a half intensity contour that spans a plurality of signal elements. The signal elements are relatively short in the direction of the information track and wide compared to the width of the information track.

Two orthogonal polarization directions are defined in FIG. 3. In the first direction, the incident light beam, which has the electric field vector $\vec{E}$ perpendicular to the information track 211, or, in the case of a spiral track on a disc, parallel to the radius of the disc, effects a zero order reflected beam of power IOE and a higher order diffrated beam of power ISE. In the second polarization direction where the electric field vector $\vec{E}$ is parallel to the information track or, in the case of a spiral track on a disc, perpendicular to the radius of the disc, consider the incident light beam as having a magnetic field vector $\vec{H}$ perpendicular to the information track 211. In the second polarization direction the incident light beam effects a zero order power IOH and a higher order diffracted power ISH.

It has been discovered that the ratio of ISE to ISH (i.e., the higher order diffraction beams for the two polarizations) is dependent upon signal depth, signal repetition rate, coherent light beam wavelength and surface conductivity. The ratio of ISH to ISE (hereinafter ISH/ISE) is plotted versus signal depth in FIG. 4a for the "ideal" case of a surface having a square wave grating of signal elements and infinite conductivity illuminated by a coherent light beam (illustratively, having a wavelength of 6328 Å) for several values of the signal element spacing $\lambda_m$. The plot of FIG. 4a illustrates a family of curves (a, b, c, d, and e) for various signal spacings (i.e., $\lambda_m$). If the inspected surface comprises an "ideal" grating, FIG. 4a provides a means for establishing the signal depth from an experimental measurement of ISE and ISH. While the depth is a double valued function of ISH/ISE, i.e. for a given ratio and a given element spacing there could be two values of signal depth, a prior knowledge of the approximate signal depth or a microscopic study of the signal elements to establish their approximate depth would be adequate to determine which depth is appropriate.

Since ISH/ISE is dependent upon the incident light beam wavelength, use of a somewhat longer wavelength laser to measure signal depth where the signal element spacing $\lambda_m$ is wide improves the accuracy of the method. FIG. 4b illustrates a plot of ISH/ISE for a helium neon laser having a 1.15 micron wavelength. Curves f, g and h illustrate the relationship between the ratio, ISH/ISE, and signal depth for signal spacings of 1.43, 1.31 and 1.14 microns respectively. Again, the signal element spacing is the same order of magnitude as the wavelength of the incident laser beam.

Even though the video disc master fabricated by the methods described supra does not have a surface of infinite conductivity and gratings which are perfect square waves, the technique described above provides a reliable and inexpensive method for measuring signal depth. Since the surface of a disc master fabricated by electron beam techniques approximates the ideal case, the general behavior of ISH/ISE versus signal depth approximates the "ideal" case. A special electron beam recorded test master was fabricated with various signal spacings recorded in circular bands. The widths of the circular bands on the test master were selected such that the incident laser beam spot size would illuminate one band at a time. Referring to FIG. 4c, a plot of ISH/ISE versus signal depth is provided for the real case where the signal depth was determined by using a scanning electron microscope. The curves of FIG. 4c provide a means for estimating signal depth from a measurement of ISH/ISE.

It should be noted that the curves i, k and l of FIG. 4c follow the general shape of the curves plotted in FIGS. 4a and 4b for the ideal grating.

By a similar technique, it is possible to establish empirical graphs for surfaces having signal elements which do not have square wave shapes. For instance, a graph of the ratio of ISE to ISH versus signal depth could be made for sinusoidal or triangular signal element shapes. These empirical graphs would provide a means for estimating signal depth from ISH and ISE for signal shapes which are not necessarily square wave.

For an illustration of an application of the principles of the present invention to a video disc system, reference is now made to FIG. 5, which shows an apparatus for measuring the depth of signal elements in a grooved video disc.

A coherent light beam from a light source 11 (illustratively in the form of an unpolarized laser) is incident on the surface of a grooved disc 15. The coherent beam illuminates the grooved surface with a light spot having a half intensity contour that spans a plurality of groove convolutions.

The orientation of the incident beam is desirably such that the axis of the incident beam lies in a plane containing the central axis and a radius of the disc and the beam's axis is oriented at a slight angle (e.g. 2°) to the central axis of the record. In addition to making the zero order beam accessible for measurement, this orientation will produce a symmetrical diffraction pattern if the signal elements are symmetrical.

A signal diffraction pattern is generated when the illuminated surface region contains signal elements. The light diffraction pattern which results when the laser beam illuminates a grooved region consists of an undeviated zero diffraction order beam of light and a plurality of groove scattered beams of light diverging in a fan pattern from the illuminated, grooved surface. When signal elements are present additional fan patterns, similar to the fan pattern diffracted by the grooves, are generated on either side of the groove diffracted fan.

A pair of linear polarizers 12 and 13 is mounted into a sliding holder 14 interposed between the laser 11 and disc 15 to polarize the unpolarized light beam. Linear polarizer 12 is arranged such that the E vector is perpendicular to the information track, or, in the case of a disc having a spiral information track, parallel to the radius of the disc. Correspondingly, linear polarizer 13 (which provides the orthogonal polarization) is arranged such that the E vector is parallel to the information track, or, in the case of a disc having a spiral information track, perpendicular to the radius.

Photodetectors 63 (illustratively signal diffraction detectors) are positioned in a plane which is angularly disposed with respect to the grooved disc surface and which laterally intersects the groove convolutions. Photodetectors 63 intercept substantially all the light diffracted by the illuminated signal elements into regions on both sides of the radial plane perpendicular to the disc surface which contains the illuminated spot and the disc center. If the laser is properly aligned, a single detector is sufficient because the intensity of the scattered light on each detector 63 would be equal.

In operation, sliding holder 14 is arranged such that the coherent light beam passes through linear polarizer 12. With the beam incident at the surface of the disc polarized so that the E vector is parallel to the radius of the disc the output power of photodetectors 63 (i.e., ISE) is measured (the power measuring apparatus is not shown in the FIGURE). Correspondingly, to measure ISH, sliding holder 14 is arranged such that the light beam passes through linear polarizer 13 which is orthogonal to polarizer 12. The signal depth can be computed from the ratio of ISH to ISE and the use of the graph of FIG. 4c.

It should be noted that other apparatus can be used to apply the principles of the present invention. In one arrangement a polarized laser can be used to determine signal depth. Referring again to FIG. 5, light source 11 (if it were to be a polarized laser) would be arranged such that the polarization incident at the surface is set at 45° to the tangent of the groove and radius of the disc while sliding holder 14 is positioned such that the light beam does not pass through the polarizers 12 and 13. In this arrangement a sliding holder having orthogonal linear polarizers (not shown in the FIGURE) would be arranged between the disc surface and one of the signal diffraction detectors 63. A measurement of ISE and ISH is then made to determine the signal depth.

In another arrangement using a laser polarized in the same manner as in the last-mentioned arrangement, one linear polarizer (not shown in the FIGURE) having an orientation which passes ISE is placed between the disc surface and one detector 63 while a second linear polarizer (not shown in the FIGURE) having an orientation which passes ISH is placed between the disc surface and the other detector 63. In this manner ISE and ISH can be simultaneously measured on independent detectors.

Where an average signal depth estimation value is desired at a given radius on a disc surface, the disc 15 is placed on a motorized turntable and rotated by the turntable such that the light beam scans the disc surface in a circular pattern. Since the disc cannot be assumed to be precisely axially symmetric, the diffraction spectrum, generated by the diffraction of the illuminating means off the disc surface is affected by the aforesaid relative motion. In practice, however, the azymuthal dependence of the measured diffraction spectrum is small and the powers of the various orders can be averaged over a chosen radius of the disc and, therefore, the derived diffraction estimate based on the average light power in the respectively measured reflected beams is representative of an "average depression depth" at the inspected radius of the disc.

The disc may also be translated in the radial direction to provide signal depth measurements at selected radii of the disc.

Thus, it will be seen, that the principles of the present invention are useful in depth measurements for flat as well as grooved surfaces and, although not limited thereto, the present invention is especially useful in video disc mastering operations for quality control purposes.

Consider now the measurement of signal width in the ideal case. If a fraction x (i.e., $x = W/T$) of the track width T is covered by signal elements of width W, the light power scattered into the higher orders, $IS_x$, is proportional to the fraction x of the signal elements or:

$$IS_x = x \cdot IS \quad (5)$$

where IS represents the power of light scattered when the signal width is equal to the track width. The zero signal order light $IO_x$ includes a contribution from the signal area that is likewise proportional to the fraction x and an additional term from the non-signaled area that is proportional to that area, $1-x$, from which all the emerging light is in the zero order. This means that:

$$IO_x = x \cdot IO + (IO + 2 \cdot IS)(1-x) \quad (6)$$

where IO represents the zero order light intensity when the signal width is equal to the track width. $x \cdot IO$ represents the contribution to $IO_x$ from the signal width while $(IO + 2 \cdot IS)(1-x)$ represents the contribution to $IO_x$ from the "flat." These two equations can be combined to provide an estimate for x that is:

$$x = \frac{[2(IS/IO) + 1](IS_x/IO_x)}{[2(IS_x/IO_x) + 1](IS/IO)} \quad (7)$$

Here, from a known signal depth, the ratio IS/IO can be calculated for the case of E, H or unpolarized radiation and the quantity $IS_x/IO_x$ would be the ratio of all scattered light (on one side of IO) to zero order light measured for the same polarization conditions. The accompanying FIG. 6 is a plot of $\sqrt{IS/IO}$ vs. signal depth calculated for the case of unpolarized 6328 Å radiation. A knowledge of the signal depth would allow a determination from the graph IS/IO. A measurement of the ideal infinite conductivity square wave grating would provide $IS_x/IO_x$. Application of equation 7 would yield a value of the fraction x. The width of the signal W can then be calculated directly from the knowledge of x as $W = xT$ where T is the track width.

As was done in the transition from FIG. 4a (ideal) to FIG. 4c (real case) for the signal depth measurement, similarly the signal width of the disc can be derived from an empirically determined graph.

Referring again to FIG. 5, a photodetector 61 and a set of track diffraction detectors 65 are arranged to intercept substantially all the light contained in the zero signal order track diffraction fan of light. To measure the signal width the sliding holder 14 is positioned such that the coherent light beam is incident on the video disc surface in an unpolarized state. In this case, the set of track diffraction detectors 65 and photodetector 61 measures the light power ($IO_x$) which represents a contribution from the signal area and an additional contribution from the non-signal area. At the same time detectors 63 detect the power $IS_x$ which represents light power scattered into the higher orders by signal area only. Knowing the ratios $IS_x/IO_x$ and IS/IO (which can be determined from the signal depth calculation) fraction x can be determined.

What is claimed is:

1. Depth estimating apparatus for use with a structure having successively spaced apart depressions of a given cross-sectional shape, said apparatus comprising:
    means for illuminating said depressions on said surface with a coherent beam of light, the structure of the depressions in the region illuminated by said light beam serving as a diffraction grating for diffracting light from said illuminated region in a diffraction pattern having a zero order and higher orders;
    means for detecting the light power diffracted from the illuminated region in the higher diffraction orders; and
    means, interposed between said illuminating means and said detecting means, for polarizing the light detected in a first direction and in a second direction orthogonal to said first direction;
    said detecting means providing a first output of the light power for said first polarization and a second output of the light power for said second polarization, the ratio of said light power outputs being indicative of the depression depth.

2. The apparatus in accordance with claim 1 wherein said coherent beam of light is of a given wavelength and wherein said spacing between said depressions has the same order of magnitude as said given wavelength.

3. The apparatus in accordance with claim 1 wherein said structure has an information track thereon and wherein said depressions are disposed along said information track.

4. The apparatus in accordance with claim 3 wherein said structure is in the form of a disc and wherein said information track is in the form of a spiral.

5. The apparatus in accordance with claim 4 wherein said first output of said detecting means is indicative of the light power in said higher diffraction orders when said coherent beam of light is polarized with the electric field vector parallel to the radius of said disc and wherein said second output of said detecting means is indicative of the light power in said higher diffraction orders when said coherent beam of light is polarized with the electric field vector perpendicular to the radius of said disc.

6. Depth estimating apparatus for use with a structure having an information track thereon, said track having successively spaced apart depressions of a given cross-sectional shape therein, said apparatus comprising:
    means for illuminating said depressions on said structure with a coherent beam of light;
    means, interposed between said illuminating means and said structure for polarizing said coherent light beam in a first direction such that the electric field vector of said light beam is perpendicular to said information track and for polarizing said coherent light beam in a second direction such that the electric field vector of said light beam is parallel to said information track;
    the structure of the depressions in the region illuminated by said light beam serving as a diffraction grating for diffracting light from said illuminated region in a diffraction pattern having a zero order and higher orders;

means for detecting the light power diffracted from the illuminated region in the higher diffraction orders;

said detecting means providing a first output of the light power of the light beam diffracted in the higher diffraction orders and polarized in said first direction and providing a second output of the light power of the light beam diffracted in the higher diffraction orders and polarized in said second direction, the ratio of said light power outputs being indicative of the depression depth.

7. The apparatus in accordance with claim 6 wherein said polarizing means comprises:
a moveable holder;
a first polarizer mounted in said moveable holder for polarizing said coherent light beam in said first direction; and
a second polarizer mounted in said moveable holder for polarizing said coherent light beam in said second direction.

8. The apparatus according to claim 6 further comprising:
means, responsive to the output of said detector, for deriving an estimate of depression depth.

9. The apparatus in accordance with claim 6 wherein said structure is in the form of a disc and wherein said information track is in the form of a spiral on a surface of said disc, said apparatus further comprising:
means for establishing relative motion between the illuminating means and said disc in a manner causing the illuminating means to successively illuminate regions of said disc surface which are at substantially equal radial distances from the center of said disc.

10. A method for estimating the width W of depressions in a regularly tracked surface, said tracks having a width T and having said depressions of a given cross-sectional shape successively spaced apart along the bottom of said tracks, said depressions having a depth D, the method comprising the steps of:
illuminating a plurality of said tracks on said surface with a coherent beam of light, the structure of the depressions in the region illuminated by said light beam serving as a diffraction grating for diffracting light from said illuminated region in a diffraction pattern having a zero order ($IO_x$) and higher orders ($IS_x$);
measuring the light power diffracted from the illuminated region in the higher diffraction orders ($IS_x$);
measuring the light power diffracted from the illuminated region in the zero diffraction order ($IO_x$);
determining the ratio of IS to IO, where IS is the higher order diffracted light power and IO is the zero order diffracted light power when the depression width W is equal to the track width T; and
determining an estimate of the depression width W where:

$$W = T\left[\frac{(2(IS/IO) + 1)(IS_x/IO_x)}{(2(IS_x/IO_x) + 1)(IS/IO)}\right]$$

* * * * *